United States Patent [19]

Mino

[11] 3,838,451

[45] Sept. 24, 1974

[54] MAGNETIC TAPE REPRODUCING SYSTEM HAVING SECONDARY SHORTING OF A ROTARY TRANSFORMER FOR HEAD SWITCHING

[75] Inventor: Mineo Mino, Osaka, Japan

[73] Assignee: Matsushita Electric Industrial Co., Ltd., Osaka, Japan

[22] Filed: June 15, 1973

[21] Appl. No.: 370,452

[52] U.S. Cl. .................................... 360/64, 360/10
[51] Int. Cl. ........................... H04n 5/78, G11b 5/52
[58] Field of Search ....... 178/6.6 HS, 6.6 FS, 6.6 A, 178/6.6 SF; 179/100.2 T

[56] References Cited

UNITED STATES PATENTS

| | | | |
|---|---|---|---|
| 3,084,214 | 4/1963 | Jauernik | 178/6.6 HS |
| 3,283,068 | 11/1966 | Urry et al. | 178/6.6 A |
| 3,361,878 | 1/1968 | Patterson et al. | 178/6.6 HS |
| 3,401,231 | 9/1968 | Baldwin | 178/6.6 HS |
| 3,536,856 | 10/1970 | Kietz | 179/100.2 T |

*Primary Examiner*—Raymond F. Cardillo, Jr.
*Attorney, Agent, or Firm*—Wenderoth, Lind & Ponack

[57] ABSTRACT

A magnetic video tape recorder has a plurality of rotary heads, transistor switching circuits are connected to secondary windings of rotary transformers which are coupled to each of the rotary heads so as to short the secondary winding when a control signal is applied to the base thereof. The control signal serves to control the operation of the transistor switching circuits in such a way that only one complete field signal at a time from among the head output signals is supplied to succeeding reproducing circuits, so that there is reproduced a still or a slow-motion picture.

4 Claims, 4 Drawing Figures

MAGNETIC TAPE REPRODUCING SYSTEM HAVING SECONDARY SHORTING OF A ROTARY TRANSFORMER FOR HEAD SWITCHING

FIELD OF THE INVENTION

This invention relates generally to an apparatus for recording and reproducing information signals, and more particularly to a magnetic tape system for producing television signals, wherein a magnetic tape is wound around the periphery of a rotary disc provided with a plurality of magnetic heads and a plurality of rotary transformers are coupled between the magnetic heads and electric circuits.

DESCRIPTION OF THE PRIOR ART

In the case where rotary transformers are employed for taking out a signal reproduced by magnetic heads in a magnetic recording and reproducing system, there is an important problem that crosstalk is produced due to mutual induction between the transformers, which results in a lower signal-to noise ratio of the reproduced signals.

Conventionally, there have been employed various methods for reducing the crosstalk between the rotary transformers. For example, there is a method of arranging the rotary transformers at positions spaced apart from each other, or a method of magnetically shielding the rotary transformers from each other. However, these methods have the disadvantage that their use causes an increase in the size of the apparatus, and are also disadvantageous due to high cost.

BRIEF SUMMARY OF THE INVENTION

Therefore, an object of the present invention is to provide a novel and improved magnetic apparatus for recording and reproducing television signals.

A further object of the invention is to provide a novel magnetic tape system for reproducing a signal without crosstalk between the rotary transformers and providing pictures having a superior quality.

Another object of this invention is to provide an apparatus for recording and reproducing television signals, which is suitable for use in a small-type video tape recorder for educational use or domestic use.

These objects are achieved by providing a magnetic tape system for reproducing television signals containing vertical synchronizing pulses according to the present invention, which comprises a rotary head assembly having a guide drum and a rotary disc, said rotary disc being provided with a plurality of magnetic heads which function as magnetic transducers for signals recorded on a magnetic tape, said magnetic tape being wound around the peripheral surface of said guide drum;

a plurality of rotary transformers having primary windings wound on rotary cores and secondary windings wound on fixed cores, respectively, said primary windings being coupled to said magnetic heads;

a reproducing circuit for reproducing television signals which is coupled to said second windings, a detecting means for generating a signal which represents a phase angle of the rotation of said rotary disc each time one rotation of said rotary disc is completed;

a means for generating a control signal in accordance with vertical synchronizing pulses contained in said reproduced television signals and said signals generated by said detecting means, and a plurality of switching means for shorting said secondary windings in accordance with said control signal so as to transmit a unit information signal, such as one field of television signals, successively to said reproducing circuit, said switching means being coupled to said secondary windings wound on said fixed cores of said rotary transformers.

BRIEF DESCRIPTION OF THE DRAWINGS

These and other objects of the invention will be apparent from a consideration of the following detailed description with reference to the accompanying drawings, wherein.

DETAILED DESCRIPTION OF THE EMBODIMENT

Figure 1:
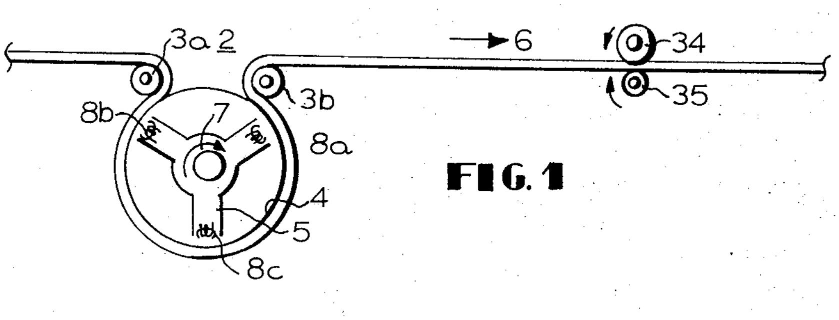
FIG. 1 is a schematic plan view of a magnetic tape apparatus according to the present invention which is capable of reproducing still pictures or slow motion picutres.
Figure 2:
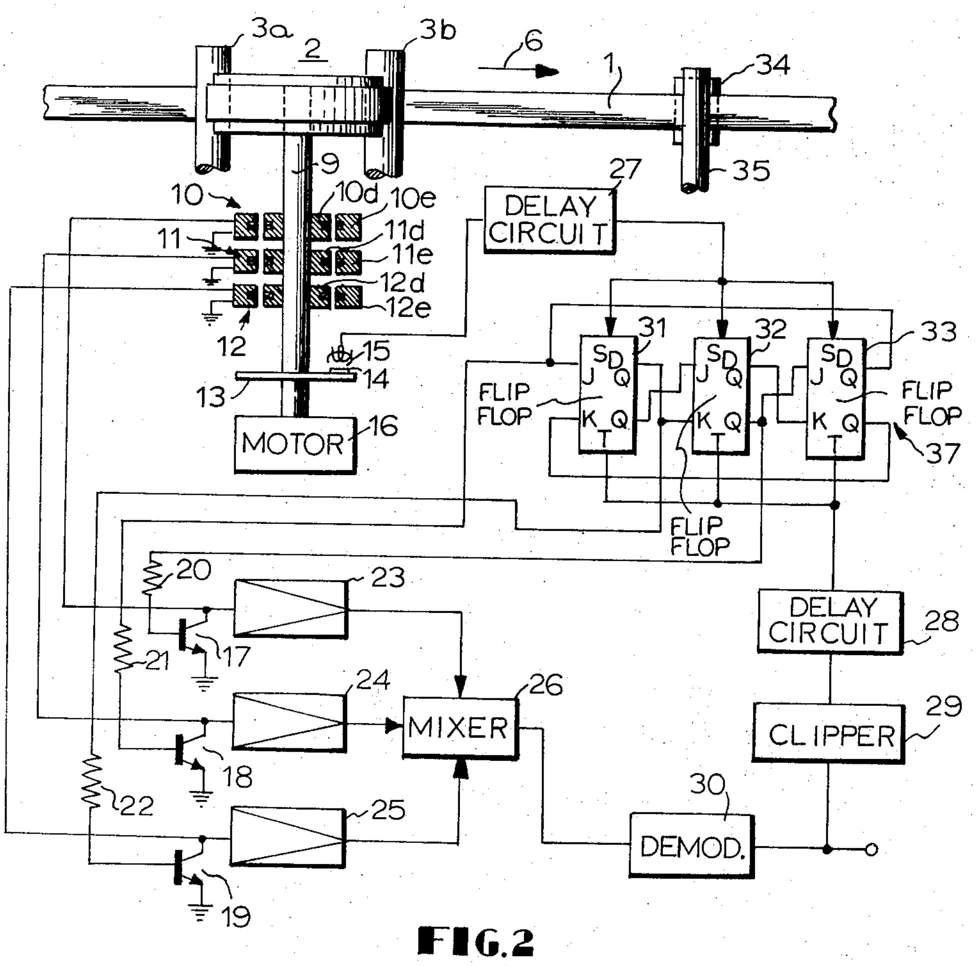
FIG. 2 is a front view of the magnetic tape apparatus shown in FIG. 1 and a block circuit diagram of an embodiment according to the present invention.

Referring to FIGS. 1 and 2, a magnetic tape designated by a reference numeral 1 is wound around a guide drum 4 of a rotary head assembly 2 being guided by guide rollers 3a and 3b. The magnetic tape is then guided between a capstan 35 and a pinch roller 34 which is able to press the magnetic tape 1 against the capstan 35. The capstan 35 causes the magnetic tape 1 to travel at a predetermined speed in the direction indicated by the arrow 6.

A rotary disc 5 mounted in the drum 4 in a conventional manner has, at its periphery, three magnetic heads 8*a*, 8*b* and 8*c* arranged at equal angular intervals of 120° and is secured to a shaft 9 of a motor 16. The magnetic heads 8*a*, 8*b* and 8*c* are rotated, in the direction indicated by the arrow 7, by means of the rotary shaft 9.

Figure 3:
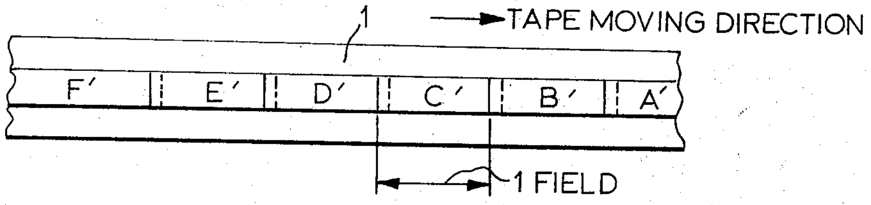
FIG. 3 shows a magnetic tape, on which there is formed a recorded track extending along the length of the magnetic tape.

The magnetic tape which is wound around the periphery of the guide drum 4 is contacted by the magnetic heads 8*a*, 8*b* and 8*c*. The length of the magnetic tape contacted by the magnetic heads 8*a*, 8*b* and 8*c* along the peripheral surface of the guide drum 4 is slightly greater than the length of the tape corresponding to two fields of information in the television signals recorded thereon as shown in FIG. 3.

Figure 4:
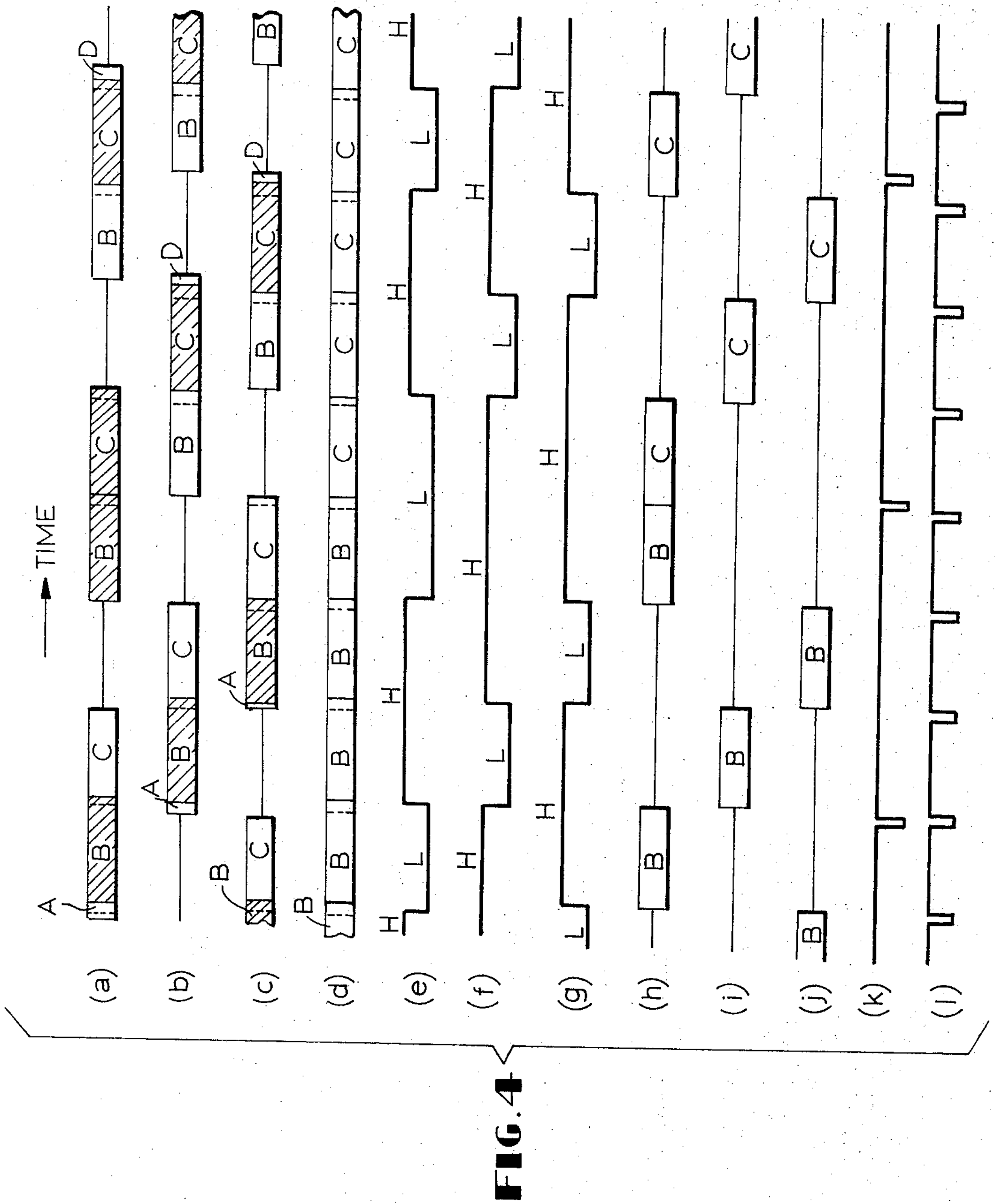
FIG. 4 is a diagram illustrating reproduced signals and signal waveforms at different points during the operation of the magnetic tape apparatus shown in FIG. 2.

Because the rotating magnetic heads 8*a*, 8*b* and 8*c* are able to reproduce signals including at least two fields of information from the magnetic tape 1, as shown by the representation of the reproduced signals in parts (*a*), (*b* ) and (*c*) of FIG. 4, these reproduced signals will necessarily include one complete field of information. Consequently, it is evident that a still or slow motion picture can be reproduced, if only the complete field information signals are successively taken out therefrom, as shown by a hatching in FIG. 4.

For producing a signal from the magnetic heads placed in a rotary head assembly, rotary transformers are usually employed. In this case, as each head feeds the reproduced signal to the accompanying rotary transformer, there is caused crosstalk at the output of each transformer due to mutual coupling of the transformers. Such crosstalk produces a beat frequency component and results in a poor picture. According to the magnetic tape system of the present invention, such crosstalk can be eliminated as described in the following.

Referring to FIG. 2, rotating cores 10*d*, 11*d* and 12*d* of rotary transformers 10, 11 and 12 are secured to the rotary shaft 9, and fixed cores 10*e*, 11*e* and 12*e* of the rotary transformers are mounted on the base plates (not shown) of the magnetic tape apparatus. The primary windings in rotating cores 10*d*, 11*d* and 12*d* are connected to the magnetic heads 8*a*, 8*b* and 8*c*, respectively. The leads extending from the secondary windings wound on the fixed cores 10*e*, 11*e* and 12*e* are coupled to the input terminals of amplifiers 23, 24 and 25 and collector electrodes of n-p-n type transistors 17, 18 and 19, respectively. The emitter electrodes of the transistors 17, 18 and 19 are grounded.

Now, if the transistors 17, 18 and 19 are placed in the "ON" condition except at the times corresponding to the signal portions shown by the hatching in FIG. 4, undesirable signals are shorted, and not supplied to the amplifiers 23, 24 and 25. Accordingly, no crosstalk is caused. That is, by connecting a transistor switch for shorting the winding associated with it to each of the secondary windings of the fixed cores of the rotary transformers and by controlling the time when these transistor switches are switched to the "ON" condition, only the desirable signals shown in the parts (*h*), (*i*) and (*j*) of FIG. 4, are fed from the rotary transformers 10, 11 and 12 to the amplifiers 23, 24 and 25, respectively.

The above mentioned signals for controlling the condition of the transistors 17, 18 and 19 can be produced in the manner to be described in the following. The input signals to the amplifiers 23, 24 and 25, shown in the parts (*h*), (*i*) and (*j*) of FIG. 4, respectively, are amplified by the corresponding amplifiers and are fed to a mixer 26. The output of the mixer is a signal as shown in part (*d*) of FIG. 4. The resulting signal is applied to a demodulator 30, and it is demodulated into a form of the television signal by the demodulator 30. The demodulated signal appears at an output terminal 36. This television signal is also supplied to a clipper 29 which separates the vertical synchronizing pulse from the television signal. The separated vertical synchronizing pulse is fed to a delay circuit 28. The delay circuit 28 delays the vertical synchronizing pulse for a predetermined time, and there is provided a pulse train having a waveform shown in part *l* of FIG. 4. This pulse train is fed to a trigger input terminals "T" of the flip-flop circuits 31, 32 and 33 which are connected as a ring counter 37.

On the other hand, a fixed magnetic transducer 15 associated with a small magnet 14 is mounted on a disc 13 which is secured to the rotary shaft 9. The fixed magnetic transducer 15 generates one impulse at each rotation of the rotary shaft 9. There is thus generated at transducer 15 an impulse representing the phase angle of rotation of the rotary disc 5. This impulse is fed to another delay circuit 27. The delay circuit 27 delays the impulse and provides a pulse train having the waveform shown in part (*k*) OF FIG. 4. This pulse train is fed to the set terminals "$S_3$" of the flip-flop circuits of the ring counter 37. As a result, a first control signal, having a waveform as shown in part (*e*) of FIG. 4, appears at an output Q in the flip-flop circuit 32, a second control signal, having a wave form as shown in part (*f*), appears at an output Q in the flip-flop circuit 33, and a third control signal, having a waveform as shown in part (*g*), appears at an output Q of the flip-flop circuit 31, respectively. Then, these control signals are applied to the bases of the transistors 17, 18 and 19 through resistors 20, 21 and 22, respectively. Because the transistors are n-p-n type transistors, when positive signals are applied to the bases thereof, the transistors are switched to the "ON" condition. Therefore, the input signals of the amplifiers 23, 24 and 25 become as shown in parts (*h*), (*i*)and (*j*) of FIG. 4.

Although, in the above description, the actual circuits used in each stage are not shown, it is evident that there are various well-known types of circuits which can be used for each of them. Further, it is obvious that field effect transistors and like devices can also be used for the switching instead of the transistors 17, 18 and 19. When field effect transistors are used, the drain and source electrodes are connected to the secondary windings of the rotary transformers and the gate electrodes are connected to the flip-flop circuits.

There has described hereinbefore a preferred embodiment of the invention, and it is apparent that various modifications may be made without departing from the spirit and scope of the invention which is defined by the following claims.

What is claimed is:

1. A magnetic tape system for reproducing television signals containing vertical synchronizing pulses, comprising:

a rotary head assembly having a guide drum and a rotary disc within said drum, said rotary disc having a plurality of magnetic heads thereon which function as magnetic transducers for signals recorded on a magnetic tape, and said magnetic tape being wound around the peripheral surface of said guide drum;

a plurality of rotary transformers having rotary core parts with primary windings wound thereon and fixed core parts having secondary windings wound thereon, respectively, said primary windings being coupled to said magnetic heads;

a reproducing circuit for reproducing television signals which is coupled to said secondary windings;

a detecting means for generating a signal which represents a phase angle of the rotation of said rotary disc each time one rotation of said rotary disc is completed;

a means coupled to said detecting means and to said reproducing circuit for generating control signals in accordance with vertical synchronizing pulses contained in said reproduced television signals and said signals generated by said detecting means; and a plurality of switching means coupled to said second windings for shorting said secondary windings in accordance with said control signals so as to transmit unit information signals, such as one field signal of television signals, successively to said reproducing circuit.

2. A magnetic tape apparatus as cliamed in claim 1, wherein said plurality of switching means consists of a plurality of transistors, the collector and emitter electrodes of said transistors being connected to said secondary windings of the respective rotary transformers and the base electrodes of said transistors being coupled to said control signal generating means so as to provide with said control signals.

3. A magnetic tape apparatus as claimed in claim 1, wherein said plurality of switching means consists of a plurality of field-effect-transistors, the drain and source electrodes of each of said field-effect-transistors being connected to said secondary windings of said rotary transformers and the gate electrode of each of said field-effect-transistors being coupled to said control signal generating means so as to be provided with said control signals.

4. A magnetic tape apparatus as claimed in claim 1, wherein said rotary head assembly has three magnetic heads and said plurality of switching means consists of three transistors, the collector and emitter electrodes of which are connected to said secondary windings of said rotary transformers and the base electrodes of which are coupled to said control signal generating means so as to be provided with said control signals.

* * * * *